US011068700B2

(12) United States Patent
Pezzaniti et al.

(10) Patent No.: US 11,068,700 B2
(45) Date of Patent: *Jul. 20, 2021

(54) POLARIZATION IMAGING FOR FACIAL RECOGNITION ENHANCEMENT SYSTEM AND METHOD

(71) Applicant: Polaris Sensor Technologies, Inc., Huntsville, AL (US)

(72) Inventors: J. Larry Pezzaniti, Huntsville, AL (US); David B. Chenault, Huntsville, AL (US)

(73) Assignee: POLARIS SENSOR TECHNOLOGIES, INC., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,374

(22) Filed: Jun. 4, 2019

(65) Prior Publication Data

US 2020/0082159 A1 Mar. 12, 2020

Related U.S. Application Data

(63) Continuation of application No. 14/602,823, filed on Jan. 22, 2015, now Pat. No. 10,311,285.
(Continued)

(51) Int. Cl.
*G06K 9/00* (2006.01)
*G06K 9/46* (2006.01)
(Continued)

(52) U.S. Cl.
CPC ......... *G06K 9/00288* (2013.01); *G02B 5/201* (2013.01); *G02B 27/00* (2013.01);
(Continued)

(58) Field of Classification Search
CPC .............. G06K 9/00288; G06K 9/209; G06K 9/00275; G06K 9/4661; G06K 9/00255; G02B 5/201; G02B 27/288; G02B 27/00
See application file for complete search history.

(56) References Cited

U.S. PATENT DOCUMENTS

4,751,387 A * 6/1988 Robillard .............. G02F 1/1313
250/330
6,037,590 A * 3/2000 Boreman .................. G01J 5/08
250/338.1
(Continued)

*Primary Examiner* — Aaron W Carter
(74) *Attorney, Agent, or Firm* — Angela Holt; Bradley Arant Boult Cummings LLP (57) ABSTRACT

A method for enhancing an image for facial recognition comprises capturing an image of the face with a polarizer and correcting the polarized image for non-uniformity. Stokes Parameters $S_0$, $S_1$, $S_2$ are obtained by weighted subtraction of the polarized image to form Stokes images. DoLP is computed from the Stokes images, and facial recognition algorithms are applied to the DoLP image. A system for enhancing images for facial recognition comprises a polarimeter configured to record polarized image data of a subject's face, a signal processing unit and logic configured to receive and store in memory the image data from the polarimeter, calculate Stokes parameters from the image data, and compute a DoLP image from the Stokes parameters.

21 Claims, 7 Drawing Sheets
(1 of 7 Drawing Sheet(s) Filed in Color)

Related U.S. Application Data (60) Provisional application No. 61/930,272, filed on Jan. 22, 2014.

(51) Int. Cl.
  *G02B 27/28* (2006.01)
  *G02B 5/20* (2006.01)
  *G06K 9/20* (2006.01)
  *G02B 27/00* (2006.01)

(52) U.S. Cl.
  CPC ....... *G02B 27/288* (2013.01); *G06K 9/00255* (2013.01); *G06K 9/00275* (2013.01); *G06K 9/209* (2013.01); *G06K 9/4661* (2013.01)

(56) References Cited

U.S. PATENT DOCUMENTS

| | | | | |
|---|---|---|---|---|
| 6,075,235 | A * | 6/2000 | Chun | G01J 4/04 250/208.1 |
| 6,122,404 | A * | 9/2000 | Barter | G02B 27/28 359/885 |
| 6,173,068 | B1 * | 1/2001 | Prokoski | A61B 5/1176 382/115 |
| 7,034,938 | B1 * | 4/2006 | Miles | G01J 3/2823 356/327 |
| 7,602,942 | B2 * | 10/2009 | Bazakos | G06K 9/00255 209/577 |
| 8,217,368 | B2 * | 7/2012 | Meyers | G01N 21/21 250/459.1 |
| 9,589,195 | B2 * | 3/2017 | Aycock | G08G 9/02 |
| 9,631,973 | B2 * | 4/2017 | Dorschner | G01J 1/0429 |
| 9,741,163 | B2 * | 8/2017 | Fest | G06T 7/60 |
| 9,830,506 | B2 * | 11/2017 | Short | G06K 9/00288 |
| 9,970,861 | B2 * | 5/2018 | Chenault | G01N 25/00 |
| 9,989,625 | B2 * | 6/2018 | Aycock | G01S 3/7861 |
| 10,311,285 | B2 * | 6/2019 | Pezzaniti | G06K 9/00275 |
| 2004/0012853 | A1 * | 1/2004 | Garcia | G02B 21/008 359/489.07 |
| 2005/0264813 | A1 * | 12/2005 | Giakos | B82Y 20/00 356/369 |
| 2006/0104488 | A1 * | 5/2006 | Bazakos | H04N 5/23219 382/118 |
| 2006/0146284 | A1 * | 7/2006 | Collins | A61B 3/1208 351/215 |
| 2006/0164643 | A1 * | 7/2006 | Giakos | G01J 3/36 356/369 |
| 2007/0146632 | A1 * | 6/2007 | Chipman | A61B 3/12 351/205 |
| 2008/0165359 | A1 * | 7/2008 | Mattox | G01J 4/04 356/367 |
| 2009/0318773 | A1 * | 12/2009 | Jung | A61B 5/165 600/300 |
| 2010/0271475 | A1 * | 10/2010 | Schwiegerling | G01J 4/04 348/135 |
| 2011/0211047 | A1 * | 9/2011 | Chhibber | H04N 5/2254 348/47 |
| 2012/0075473 | A1 * | 3/2012 | Sarwar | G01J 4/00 348/156 |
| 2012/0075513 | A1 * | 3/2012 | Chipman | G01J 4/04 348/302 |
| 2012/0257800 | A1 * | 10/2012 | Zheng | G06K 9/527 382/118 |
| 2012/0268571 | A1 * | 10/2012 | Debevec | G06T 7/586 348/48 |
| 2013/0063722 | A1 * | 3/2013 | Sparks | G01J 3/447 356/327 |
| 2013/0076932 | A1 * | 3/2013 | Chhibber | A61B 5/0077 348/222.1 |
| 2013/0293871 | A1 * | 11/2013 | Gruev | G01J 4/04 356/73 |
| 2014/0247361 | A1 * | 9/2014 | Sarwar | G06K 9/00255 348/156 |
| 2014/0314332 | A1 * | 10/2014 | Mudge | H04N 5/21 382/255 |
| 2015/0168210 | A1 * | 6/2015 | Dorschner | G01J 1/42 349/18 |
| 2015/0226827 | A1 * | 8/2015 | Aycock | G01S 3/783 382/103 |
| 2016/0003677 | A1 * | 1/2016 | Pezzaniti | G02B 5/3058 250/330 |
| 2016/0037089 | A1 * | 2/2016 | Silny | H04N 5/332 250/332 |
| 2016/0061665 | A1 * | 3/2016 | Chenault | G06T 5/50 356/51 |
| 2016/0232709 | A1 * | 8/2016 | Videen | H04N 5/33 |
| 2016/0253551 | A1 * | 9/2016 | Pezzaniti | G02B 5/201 382/118 |
| 2016/0307053 | A1 * | 10/2016 | Aycock | G06T 5/50 |
| 2017/0132458 | A1 * | 5/2017 | Short | G06K 9/00255 |
| 2017/0178399 | A1 * | 6/2017 | Fest | G06T 7/70 |
| 2017/0184700 | A1 * | 6/2017 | Aycock | G01S 3/7861 |
| 2017/0299501 | A1 * | 10/2017 | Chenault | G06K 9/0063 |
| 2018/0005012 | A1 * | 1/2018 | Aycock | G06K 9/0063 |
| 2018/0189547 | A1 * | 7/2018 | Daniels | G06K 9/00617 |
| 2020/0082159 | A1 * | 3/2020 | Pezzaniti | G06K 9/209 |
| 2020/0285838 | A1 * | 9/2020 | Hu | G06K 9/00288 |

* cited by examiner

POLARIZATION IMAGING FOR FACIAL RECOGNITION ENHANCEMENT SYSTEM AND METHOD

REFERENCE TO RELATED APPLICATIONS

This application is a continuation of, and claims priority to, U.S. Non-provisional patent application Ser. No. 14/602,823, entitled "Polarization Imaging for Facial Recognition Enhancement System and Method, and filed on Jan. 22, 2015, which claims priority to Provisional Patent Application U.S. Ser. No. 61/930,272, entitled "Polarization Imaging for Facial Recognition Enhancement" and filed on Jan. 22, 2014. Both applications are fully incorporated herein by reference.

GOVERNMENT LICENSE RIGHTS

This invention was made with government support under Contract Number W911QX-12-C-0008 awarded by the U.S. Army. The government has certain rights in the invention.

BACKGROUND AND SUMMARY

A method using Long Wave Infrared ("LWIR") Imaging Polarimetry for facial recognition in total or near darkness is disclosed herein. The method employs LWIR imaging polarimetry to enhance thermal imagery for facial recognition purposes. One method of polarimetry for the embodiment of the method comprises capturing a number of images of different polarization states of the face using a polarization filter in conjunction with a thermal camera, correcting each image for non-uniformity and performing weighted subtractions of said images to produce Stokes Parameters images $S_0$, $S_1$, $S_2$ and Degree of Linear Polarization Images ("DoLP") from those Stokes images. Finally, facial recognition algorithms may be applied to the DoLP image, or the images may simply be viewed by a human for facial recognition.

In another embodiment, a subject's face is centered in the field of view of the LWIR imaging polarimeter, focused and a thermal/polarimetric hybrid image is collected.

DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
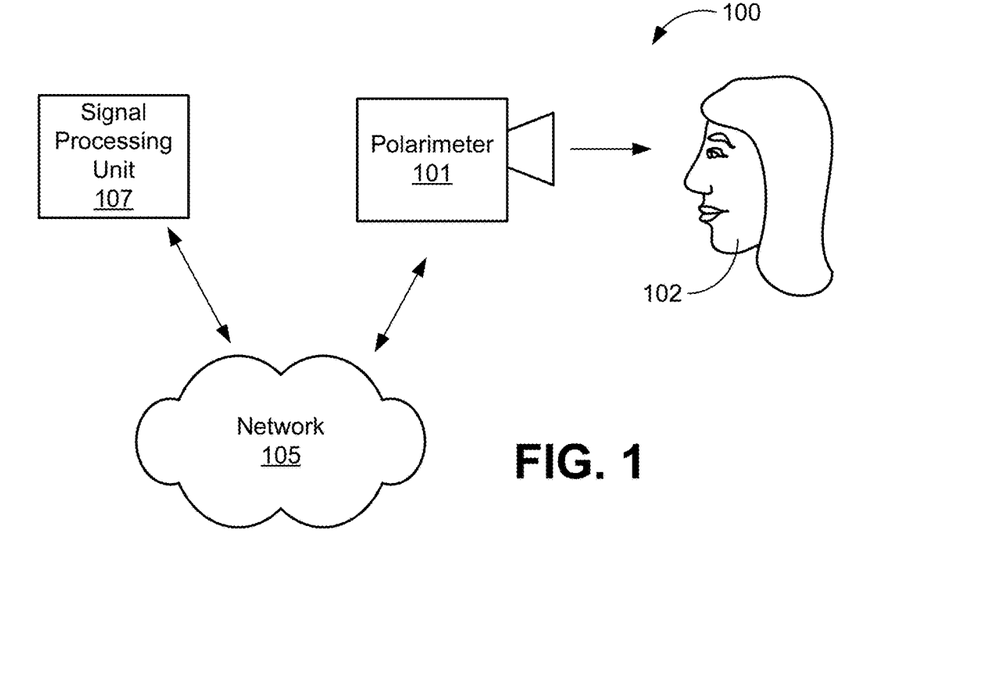
FIG. 1 is a block diagram illustrating a system in accordance with an exemplary embodiment of the present disclosure.

FIG. 1 illustrates a system 100 in accordance with an exemplary embodiment of the present disclosure. The system 100 comprises a polarimeter 101 and a signal processing unit 107 which collect and analyze images of a subject's face 102, respectively.

The polarimeter 101 comprises a polarizing imaging device (not shown) for recording polarized images, such as a digital camera or thermal imager that collects images. The polarimeter 101 transmits raw image data to the signal processing unit 107, which processes the data as further discussed herein. Although FIG. 1 shows the polarimeter 101 and the signal processing unit 107 as two separate items, the polarimeter 101 and signal processing unit 107 are packaged into one device in certain embodiments.

In the illustrated embodiment, the polarimeter 101 sends raw image data (not shown) to the signal processing unit 107 over a network 105. The signal processing unit 107 may be any suitable computer known in the art or future-developed. The signal processing unit 107 receives the raw image data, filters the data, and analyzes the data as discussed further herein to provide facial images. The network 105 may be of any type network or networks known in the art or future-developed, such as the internet backbone, Ethernet, Wifi, WiMax, broadband over power line, coaxial cable, and the like. The network 105 may be any combination of hardware, software, or both. Further, the network 105 could be resident in a sensor (not shown) housing both the polarimeter 101 and the signal processing unit 107.

Figure 2:
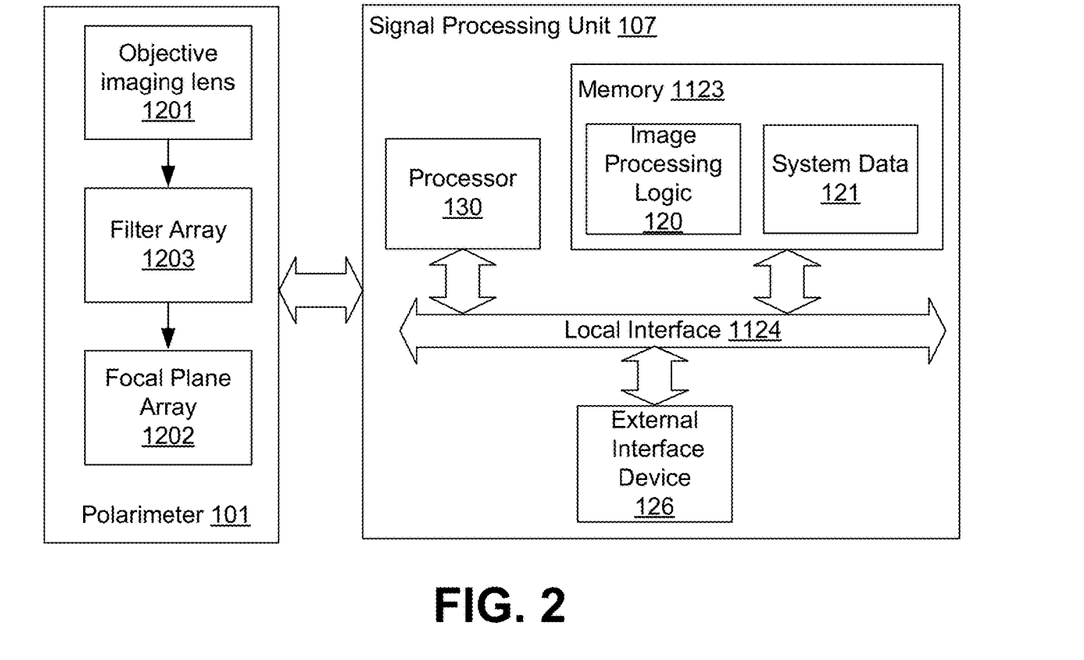
FIG. 2 depicts an exemplary polarimeter and signal processing unit as depicted in FIG. 1.

FIG. 2 depicts an exemplary polarimeter 101 and signal processing unit 107 according to an embodiment of the present disclosure.

The polarimeter 101 comprises an objective imaging lens 1201, a filter array 1203, and a focal plane array 1202. The objective imaging lens 1201 comprises a lens pointed at the subject's face 102 (FIG. 1). The filter array 1203 filters the images received from the objective imaging lens system 1201. The focal plane array 1202 comprises an array of light sensing pixels. The polarimeter 101 is discussed further with respect to FIGS. 12 and 13 herein.

The signal processing unit 107 comprises image processing logic 120 and system data 121. In the exemplary signal processing unit 107 image processing logic 120 and system data 121 are shown as stored in memory 1123. The image processing logic 120 and system data 121 may be implemented in hardware, software, or a combination of hardware and software.

The signal processing unit 107 also comprises a processor 130, which comprises a digital processor or other type of circuitry configured to run the image processing logic 120 by processing the image processing logic 120, as applicable. The processor 130 communicates to and drives the other elements within the signal processing unit 107 via a local interface 1124, which can include one or more buses. When stored in memory 1123, the image processing logic 120 and the system data 121 can be stored and transported on any computer-readable medium for use by or in connection with logic circuitry, a processor, an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Exemplary system data 121 is depicted comprises:
a. Raw image data (not pictured) from the polarimeter 101 (FIG. 2) obtained from step 1001 of the method 100 (FIG. 3).
b. Corrected image data (not pictured), which is the data that has been corrected for non-uniformity per step 1002 of the method 1000 (FIG. 3).
c. Stokes images obtained from step 1003 of the method 1000 (FIG. 3).
d. DoLP image data obtained from step 1004 of the method 1000 (FIG. 3).
e. Facial recognition algorithms applied in step 1005 of the method 1000 (FIG. 3).
f. Thermal image data as described herein.
g. Hybrid thermal/polarization images as described herein.

Figure 3:
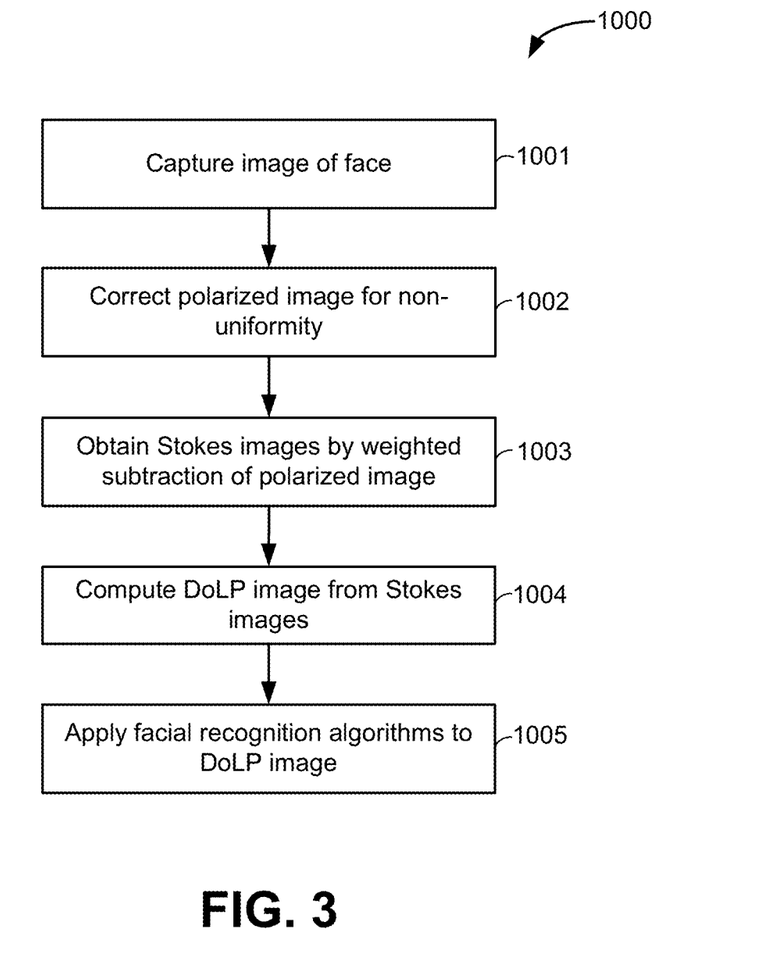
FIG. 3 is a flowchart depicting exemplary architecture and functionality of the system logic in accordance with an exemplary embodiment of the disclosure.

The image processing logic 120 executes the processes described herein with respect to FIG. 3.

Referring to FIG. 2, an external interface device 126 connects to and communicates with the navigation/localization applications 103. The external interface device 126 may also communicate with or comprise an input device, for example, a keyboard, a switch, a mouse, and/or other type of interface, which can be used to input data from a user of the system 100. The external interface device 126 may also communicate with or comprise a display device (not shown) that can be used to display data to the user. The external interface device 126 may also or alternatively communicate with or comprise a personal digital assistant (PDA), computer tablet device, laptop, portable or non-portable computer, cellular or mobile phone, or the like. The external interface device may also or alternatively communicate with or comprise a non-personal computer, e.g., a server, embedded computer, FPGA, microprocessor, or the like.

The external interface device 126 is shown as part of the signal processing unit 107 in the exemplary embodiment of FIG. 2. In other embodiments, the external interface device 126 may be outside of the signal processing unit.

FIG. 3 is a flowchart depicting exemplary architecture and functionality of the image processing logic 120 (FIG. 2) in accordance with a method 1000. In step 1001 of the method 1000, the polarimeter 101 captures an image of a face 102 (FIG. 1) and sends raw image data to the signal processing unit 107 (FIG. 1).

In step 1002, the signal processing unit 107 (FIG. 1) corrects imager non-uniformity of the images received from the polarimeter 101. Examples of imager non-uniformity include fixed pattern lines in the image, noisy pixels, bright spots, and the like. Algorithms that are known in the art may be used for correcting the imager non-uniformity. In some embodiments, step 1002 is not performed because the imager non-uniformity does not require correction.

In step 1003, the Stokes parameters ($S_0$, $S_1$, $S_2$) are calculated from the resultant image by weighted subtraction of the polarized image obtained in step 1002. The LWIR imaging polarimeter measures both a radiance image and a polarization image. A radiance image is a standard image whereby each pixel in the image is a measure of the radiance, typically expressed in of radiance Watts/cm$^2$-sr reflected or emitted from that corresponding pixel area of the scene. Standard photographs and thermal images are radiance images, simply mappings of the radiance distribution emitted or reflected from the scene. A polarization image is a mapping of the polarization state distribution across the image. The polarization state distribution is typically expressed in terms of a Stokes image.

Of the Stokes parameters, $S_0$ represents the conventional LWIR thermal image with no polarization information. $S_1$ and $S_2$ display orthogonal polarimetric information. Thus the Stokes vector, first introduced by G. G. Stokes in 1852, is useful for describing partially polarized light. The Stokes vector is defined as $$\vec{S} = \begin{bmatrix} s_0 \\ s_1 \\ s_2 \\ s_3 \end{bmatrix} = \begin{bmatrix} I_0 + I_{90} \\ I_0 - I_{90} \\ I_{45} - I_{135} \\ I_R - I_L \end{bmatrix} \quad (1)$$

where $I_0$ is the radiance that is linearly polarized in a direction making an angle of 0 degrees with the horizontal plane, $I_{90}$ is radiance linearly polarized in a direction making an angle of 90 degrees with the horizontal plane. Similarly $I_{45}$ and $I_{135}$ are radiance values of linearly polarized light making an angle of 45° and 135° with respect to the horizontal plane. Finally $I_R$ and $I_L$ are radiance values for right and left circularly polarized light. For this invention, right and left circularly polarized light is not necessary and the imaging polarimeter does not need to measure these states of polarization. For this reason, the Stokes vectors considered are limited to the first 3 elements which express linearly polarized light only, $$\vec{S} = \begin{bmatrix} s_0 \\ s_1 \\ s_2 \end{bmatrix} = \begin{bmatrix} I_0 + I_{90} \\ I_0 - I_{90} \\ I_{45} - I_{135} \end{bmatrix} \quad (2)$$

Another useful form of equation (2) is a normalized form of the equation given by $$\vec{s} = s_0 \begin{bmatrix} 1 \\ s_1/s_0 \\ s_2/s_0 \end{bmatrix} = (I_0 + I_{90}) \begin{bmatrix} 1 \\ (I_0 - I_{90})/(I_0 + I_{90}) \\ (I_{45} - I_{135})/(I_0 + I_{90}) \end{bmatrix} \quad (3)$$

The polarization state emitted or reflected from the surface of human skin depends on a number of factors including the angle of emission, the surface temperature of the skin, the micro-roughness of the skin, the complex refractive index of the skin and the background temperature of the surrounding environment. The invention here primarily makes use of the fact that the polarization state of light emitted and reflected from the skin is a function of angle of emission.

The emissivity of an object is determined from Kirchoff's radiation law. The most familiar form of Kirchoff's law is gives the emissivity of a surface ε in terms of the reflectance r, given by $$\varepsilon(\theta,\phi) = 1 - r(\theta) \tag{4}$$

where θ is the angle between the surface normal and the camera's line of sight. The more general equations for Kirchoff's law are given by $$\varepsilon_p(\theta) = 1 - r_p(\theta) \tag{5}$$

and $$\varepsilon_s(\theta) = 1 - r_s(\theta) \tag{6}$$

where the subscripts p and s denote the emissivity and reflectance of particular polarization states. The p-state indicates the plane of emission for light that is linearly polarized in a plane that contains the surface normal and the line of sight to the camera. For example, if the camera is looking down at a horizontal surface, the p-state of polarization would appear vertically polarized. The s-state of polarization is perpendicular to the p-state. Note that temperature and wavelength dependence is suppressed in equations 4-6.

Substituting equations (5) and (6) into equation (3) gives $$\vec{s} = s_0 \begin{bmatrix} 1 \\ P(\theta)\cos(\phi) \\ P(\theta)\sin(\phi) \end{bmatrix} \tag{7}$$

where φ is the angle that the plane of incidence makes with the horizontal plane and $$P(\theta) = \left( \frac{\varepsilon_s(\theta) - \varepsilon_p(\theta)}{\varepsilon_s(\theta) + \varepsilon_p(\theta)} \right) \tag{8}$$

Equation 8 can be written out more explicitly as $$P(\theta) = \left( \frac{1 - r_s(\theta) - (1 - r_p(\theta))}{1 + r_s(\theta) + 1 + r_p(\theta)} \right) = \left( \frac{r_p(\theta) - r_s(\theta)}{2 + r_p(\theta) + r_s(\theta)} \right)$$

where $r_p$ and $r_s$ are given by the Fresnel equations for reflection $$r_p = \sqrt{\frac{n^2\cos(\theta) - \sqrt{n^2 - \sin^2(\theta)}}{n^2\cos(\theta) + \sqrt{n^2 - \sin^2(\theta)}}} \tag{9a}$$

$$r_s = \sqrt{\frac{\cos(\theta) - \sqrt{n^2 - \sin^2(\theta)}}{\cos(\theta) + \sqrt{n^2 - \sin^2(\theta)}}} \tag{9b}$$

Note that P(θ) does not explicitly depend on the angle φ that the plane of incidence makes with the horizontal plane. The angle φ is critical to determine the orientation of plane of incidence and ultimately the azimuthal angle of the surface normal. The angle φ can be determined from the following angle, $$\phi = \arctan\left(\frac{s_2}{s_1}\right) \tag{10}$$

The angle θ can be determined a number of ways. Methods for determining θ and φ from normalized Stokes images (Eqn 3) are known in the art.

In step 1004, a degree of linear polarization (DoLP) image is computed from the Stokes images. A DoLP image is useful for visualizing a face, and can be calculated as follows:

$$DoLP = \sqrt{(s_1/s_0)^2 + (s_2/s_0)^2} \text{ or} \tag{11}$$

$$DoLP = \left( \frac{\varepsilon_s(\theta) - \varepsilon_p(\theta)}{\varepsilon_s(\theta) + \varepsilon_p(\theta)} \right) = \left( \frac{r_p(\theta) - r_s(\theta)}{2 + r_p(\theta) + r_s(\theta)} \right) \tag{12}$$

Note that DoLP is linear polarization. As one with skill in the art would know, in some situations polarization that is not linear (e.g., circular) may be desired. Thus in other embodiments, step 1004 may use polarization images derived from any combination of $S_0$, $S_1$, $S_2$, or $S_3$ and is not limited to DoLP.

In step 1005, facial recognition algorithms that are known in the art are applied to the DoLP image from step 1004. Some facial recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation. Non-restrictive examples include Principal Component Analysis using eigenfaces, Linear Discriminate Analysis, Elastic Bunch Graph Matching using the Fisherface algorithm. In other embodiments, the DoLP image may be viewed by humans for facial recognition, and no algorithms are applied.

Figure 4:
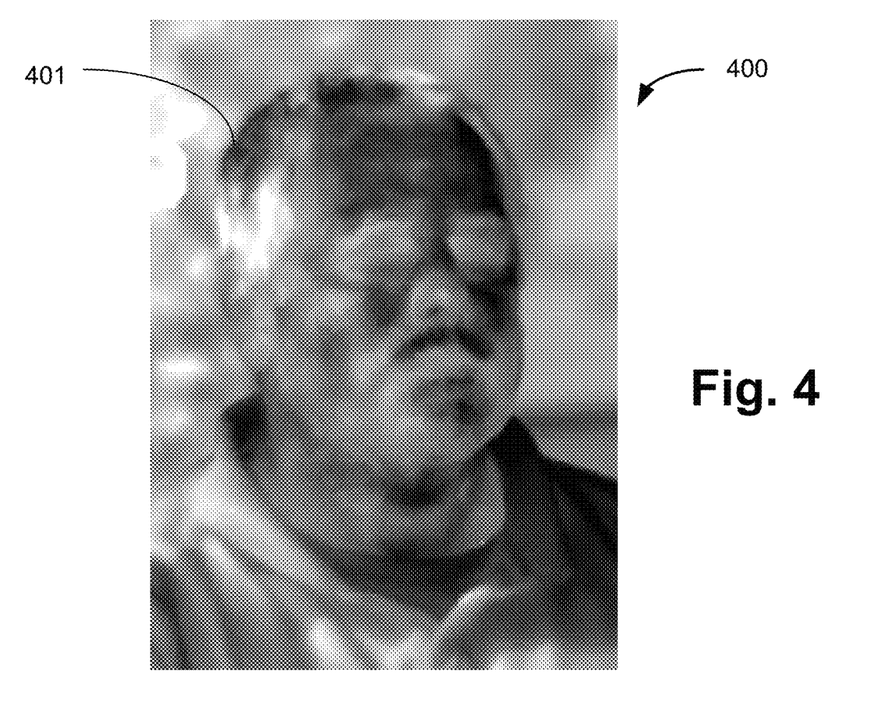
FIG. 4 depicts a standard thermal image of a man sitting in total darkness (no visible light).

FIG. 4 shows an exemplary standard thermal image 400 taken of a test subject 401 in total darkness. The thermal image 400 looks like an individual that can be recognized as a man. The overall shape of the subject's head and haircut can be determined as well as clothing. However, there is not enough detail in the facial features around the eyes, mount and nose to identify this man. The reason for the lack of detail in the facial features is that the thermal radiance image 400 is based on surface temperature and not surface geometry. In a standard visible image taken in daylight, as opposed to a thermal image captured in darkness, the detail of the face can be discerned by looking at color, shades based on light scatter, shadows, surface roughness and a host of cues. In the thermal image 400, the image is only based on apparent temperature which can appear uniform in spite of the underlying surface detail.

Figure 5:
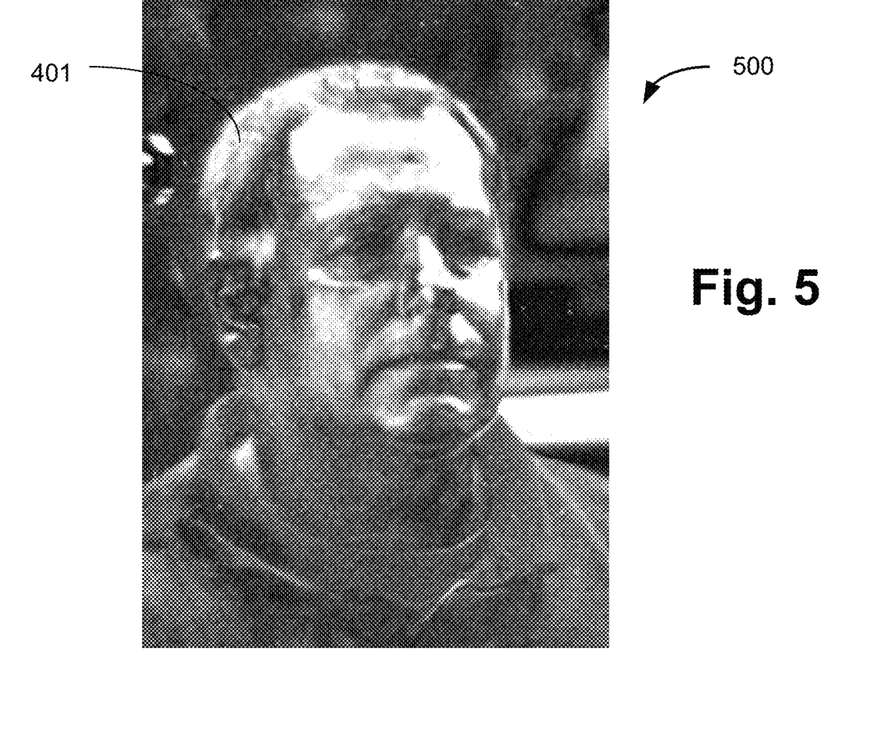
FIG. 5 depicts a DoLP image of the man of FIG. 4, sitting in total darkness.

FIG. 5 is a DoLP image 500 of the subject 401 of FIG. 4. The DoLP image 500 was generated using the method 1000 of FIG. 3. In the DoLP image 500, the facial features around the eyes, nose, mouth, face, ear, hair are all more discernible. This image 500 is sufficiently detailed that a human or automated facial recognition software can recognize the face from the image 500. The reason that the DoLP image 500 is so detailed is that the surface normal information (surface topology) is "nested" in the DoLP image 500. The surface normal dependence of the DoLP image can be seen in equation 12.

Figure 6:
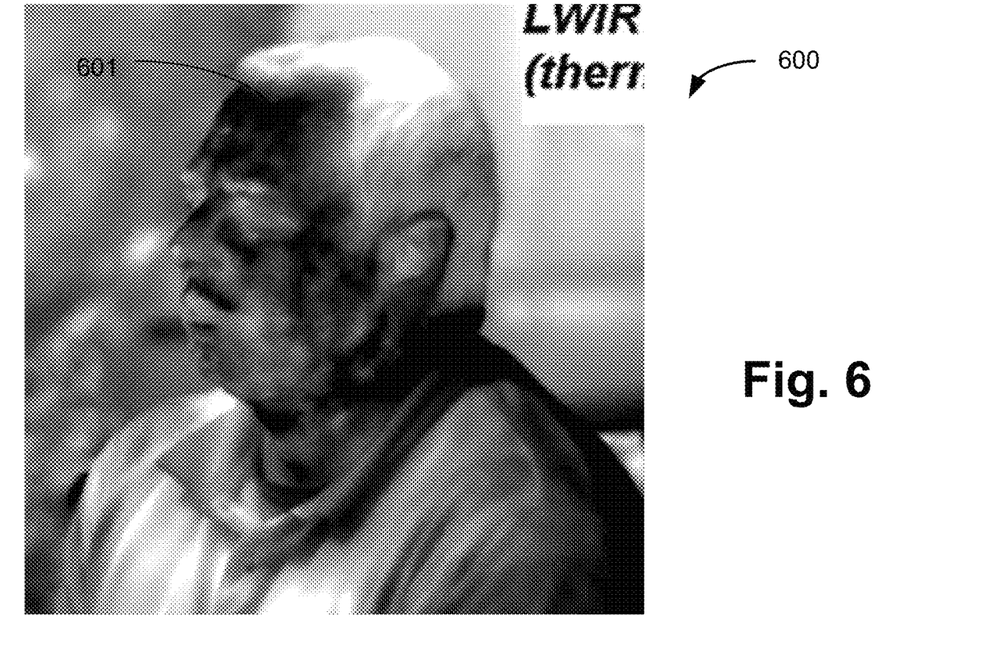
FIG. 6 depicts a standard thermal image of a man sitting in total darkness.
Figure 7:
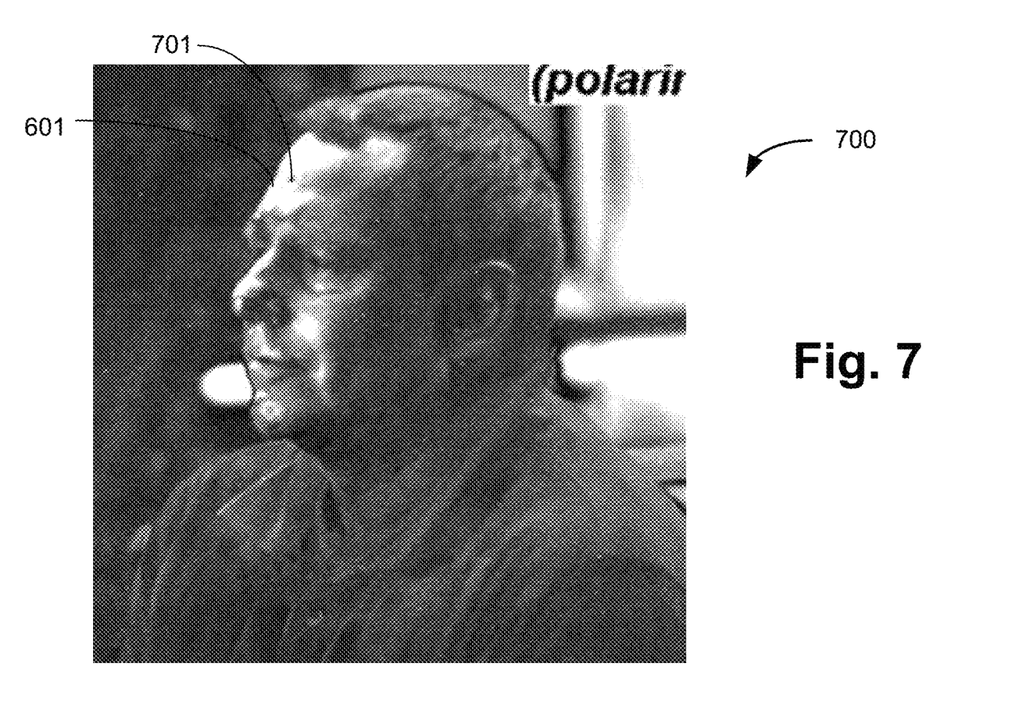
FIG. 7 depicts a DoLP image of the man of FIG. 6 sitting in total darkness

FIG. 6 shows another thermal image 600 of the same test subject 601 shown in FIG. 4, at a different orientation. Note that several characteristics of the man are not visible in the thermal image, for the reasons discussed above. In addition, in the thermal image 600, since the subject's upper lip is somewhat cooler than the surrounding face, the thermal image 600 gives the illusion that the man wears a mustache. Also, because of the capillary circulation in the face, the face looks mottled or splotchy. This mottle effect is an artifact of the circulation in the face, which changes depending on the environment, the man's physiology and many factors. FIG. 7 shows a DoLP image 700 of the thermal image 600; the DoLP image 700 is immune to these artifacts. It is clear in the DoLP image 700 that the subject does not have a mustache. Instead the shape and contour of the subject's mouth is revealed. The nose shape is discernible and detail in the eye socket is revealed. A dimple 701 that is not visible in the thermal image 600 is visible on the subject's forehead. The shape of the chin and neck are also visible. The DoLP image 700 provides an image based on emission, as opposed to reflection, such that the image can be seen in total darkness, while preserving enough of the surface detail that is available in a visible image so that facial recognition is possible.

Figure 8:
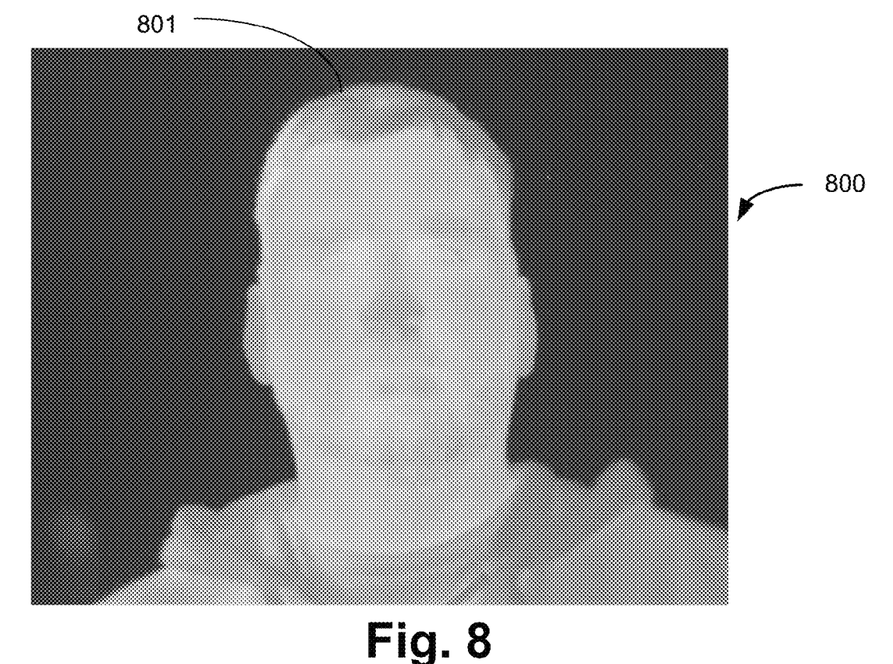
FIG. 8 depicts a standard thermal image of a man with a beard.
Figure 9:
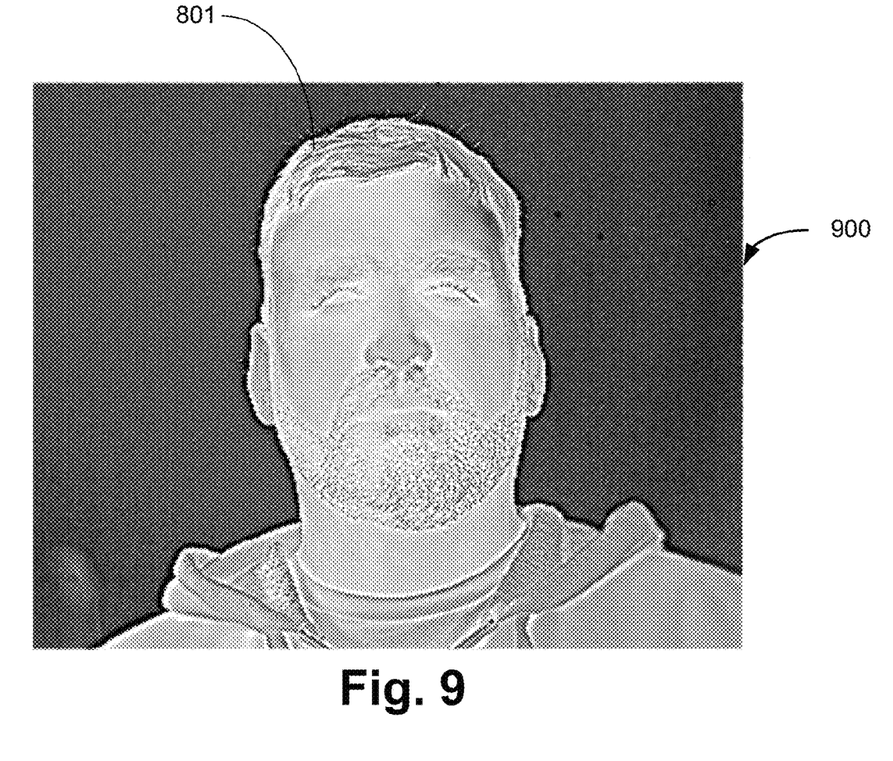
FIG. 9 depicts a hybrid polarimetric/thermal image of same man with beard.

The polarization information collected with the LWIR imaging polarimeter can be presented in a number of ways. Those practiced in the art can imagine a very large number of ways to combine the measured parameters to enhance the visualization of a human face in a variety of ways. One exemplary way is to generate a hybrid thermal/polarization image by overlaying a polarization image obtained from the method 1000 of FIG. 3 onto a thermal image. FIG. 8 shows a standard thermal image 800 of another man 801, the man 801 having a mustache and a beard. Note that although there is an indication of facial hair in the thermal image, the image is blurry and the facial hair is not positively identifiable. FIG. 9 is an image 900 which is the image 800 of FIG. 8 with polarization content overlay. The polarization of the face is added to the image by showing the polarization content in color. The color may be used to discern the surface contour of the face. In addition, the polarization enhances the high frequency content of the facial hairs on the face.

Figure 10:
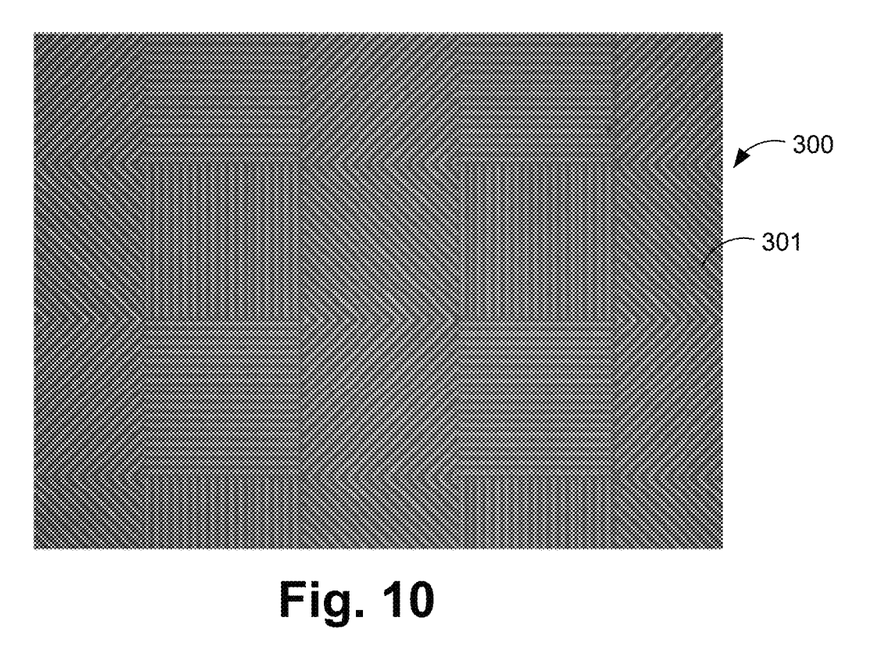
FIG. 10 is a magnified image of an exemplary PPA made up of wire grid polarizers.

Many different imaging polarimeter architectures have been developed and are commercially available to use for capturing LWIR DoLP images of faces. One exemplary architecture is a Divided Focal Plane Array (DFPA) imaging polarimeter. In such a polarimeter, a Pixelated Polarizer Array (PPA) comprises pixels which are aligned to and brought into close proximity to the pixels of a Focal Plane Array (FPA). FIG. 10 is a magnified image of an exemplary PPA 300 made up of wire grid polarizers. The pixels 301 are arranged in a periodic pattern made up of super pixels 1100 (FIG. 11).

Figure 11:
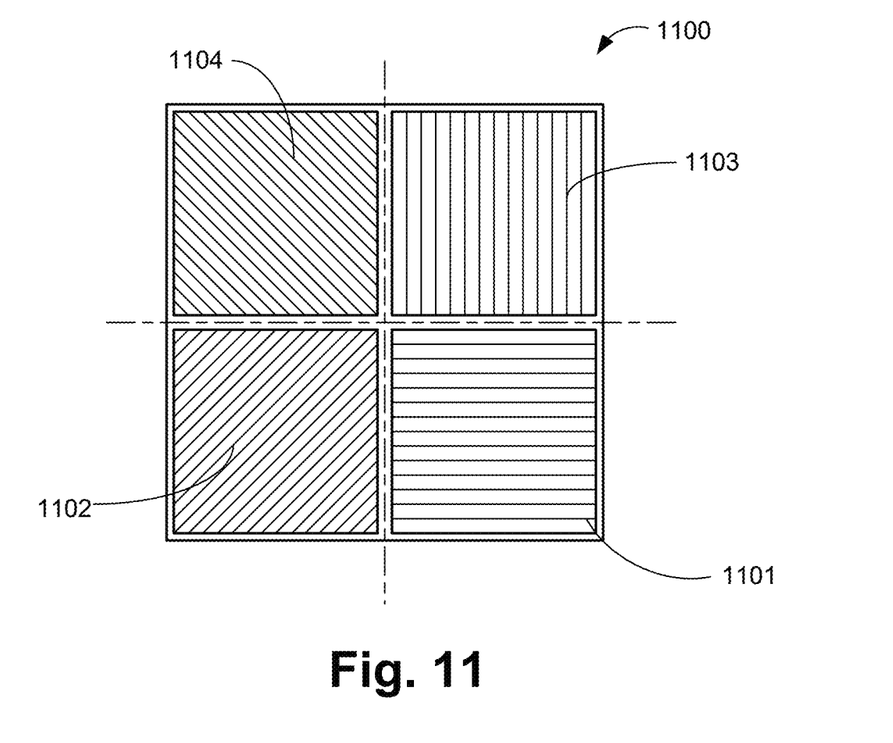
FIG. 11 depicts an exemplary super pixel according to an embodiment of the present disclosure.

FIG. 11 depicts an exemplary super pixel 1100 according to an embodiment of the present disclosure. The super pixel 1100 is a 2×2 array that measures typically four (4) states of polarization 1101, 1102, 1103, and 1104, which represent 0°, 45°, 90°, and 135° states of linearly polarized light, respectively.

In an alternative embodiment, a super pixel may comprise a three (3) pixel super-pixel arrangement, in which the measurements of linear polarization are 60 degrees apart, for example 0°, 60° and 120°.

The DFPA imaging polarimeter of this type works very similar to a color camera which uses BAYER filters. The BAYER filter array also has super-pixels typically containing a red pixel, a blue pixel and two green pixels. Interpolation techniques that are very well known to those practiced in the art are used to interpolate between pixels of like polarization states just as it is in pixels of like color. The images are interpolated to obtain the pixel format of the FPA. For example, if the FPA is 640×512 pixels, then each polarized image will be 320×256 in size. The images are up-sampled to become again 640×512 images. Once the images are up-sampled, they are subtracted to obtain the Stokes images.

Figure 12:
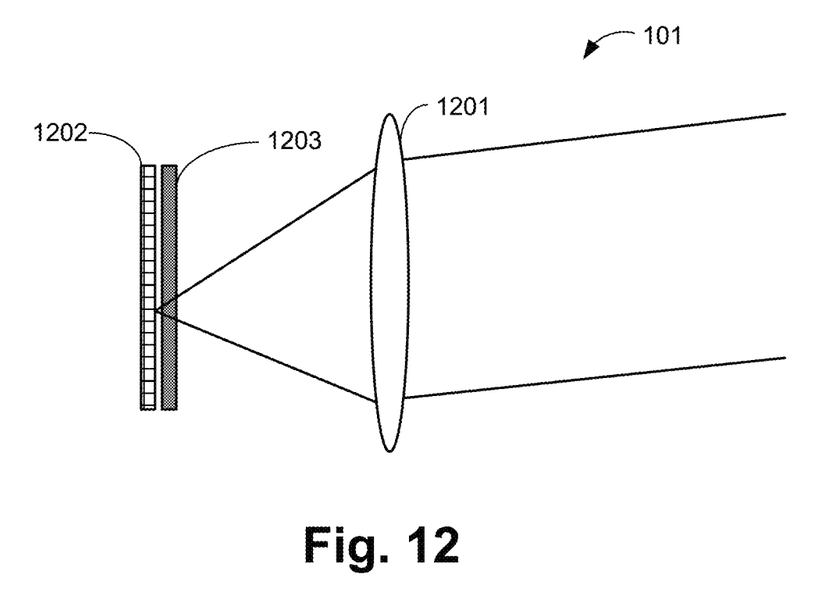
FIG. 12 depicts an exemplary DFPA imaging architecture for the polarimeter in schematic form.

FIG. 12 depicts an exemplary DFPA imaging architecture for the polarimeter 101 (FIG. 2) in schematic form. In this embodiment, the objective lens 1201 focuses images onto the FPA 1202. A filter array 1203 is disposed between the FPA 1202 and the lens 1201. The filter array 1202 filters the images received from the objective imaging lens 1201.

Figure 13:
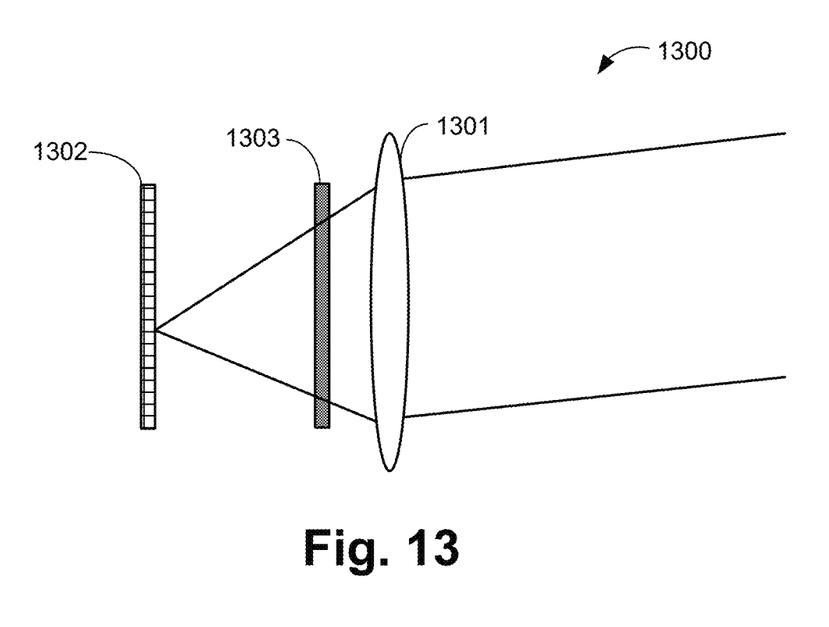
FIG. 13 depicts another alternative architecture for a polarimeter, a rotating polarization element imaging polarimeter.

FIG. 13 depicts another alternative architecture for a polarimeter, a rotating polarization element imaging polarimeter 1300. In this architecture, a uniform polarizing filter 1303 is placed before the FPA 1302. Images are captured at a number of orientations of the polarization filter 1303. For example, the polarization filter 1303 could be a linear polarizer and images could be captured at 0°, 45°, 90°, and 135° orientations of the polarizer in order to capture the needed states of polarization to compute the Stokes images. The filter 1303 could be rotated continuously and the camera triggered at each desired orientation of the filter 1303. The images of the different polarization states are thus captured sequentially in time.

The images must be captured fast enough (minimizing time between subsequent measurements of polarization images) so that the subject does not move between measurements. The speed at which the measurements must be taken depends on how quickly the test subject is expected to move. The rule of thumb is that the subject should not move more than ¼ pixel between measurements of the required polarization images. If the test subject moves more than a ¼ pixel then the images must be registered using standard Affine correction image registration methods.

By way of non-limiting example, if the test subject is asked to be still, a frame capture rate of 60 frames per second is fast enough that the polarization images are registered to one another to within ¼ pixel. At 60 frames per second, the entire sequence of images may be captured in 50 milliseconds. Therefore, if the image of the face is resolved to 1 mm spatial resolution, then the test subject should not move any faster than 0.001/0.05*(¼)=5 mm/sec.

In some instances, unless the test subject is asked to be still, motion artifacts must be removed in processing. Registration algorithms that are known in the art may be applied to register the images using the features of the face to register the images.

In the schematic of FIG. 12, the arrangement of the objective lens 1301 and the FPA 1302 is just like a standard imager. However, the linear polarizer (filter 1303) is positioned preferably between the objective lens and the FPA. In other embodiments the filter 1303 may be in front of the objective lens 1301, in order that the objective lens is not modified. However, positioning the filter 1302 between the objective lens 1301 and the FPA 1302 may be desired in order to avoid ghost images on the FPA. This phenomena is called Narcissus and is well known to those practiced in the art.

The embodiments discussed herein have been directed to facial recognition. However, as is known by persons with skill in the art, human ears may also be recognized using ear detection algorithms that are known in the art. Thus the methods disclosed herein for facial recognition are equally applicable to human ear detection.

This disclosure may be provided in other specific forms and embodiments without departing from the essential characteristics as described herein. The embodiments described are to be considered in all aspects as illustrative only and not restrictive in any manner. Other embodiments of polarimeter are known to those practiced in the art and include Division of Amplitude and Division of Aperture polarimetric architectures.

What is claimed is:

1. A method of obtaining enhanced images for facial recognition, the method comprising:
    recording, with a long wave infrared polarimeter, raw image data of a subject's face to obtain a number of polarized images;
    correcting the polarized images for non-uniformity;
    calculating Stokes parameters $S_0$, $S_1$, and $S_2$ from the polarized images to create Stokes images by weighted subtraction of the polarized images; and
    computing polarization images derived from the Stokes images.

2. The method of claim 1, wherein the step of computing polarization images derived from the Stokes images comprise computing a Degree of Linear Polarization (DoLP) image from the Stokes images.

3. The method of claim 1, further comprising applying facial recognition algorithms to polarization images.

4. The method of claim 2, wherein the polarimeter comprises an objective lens, a polarization filter, and a focal plane array.

5. The method of claim 4, wherein the focal plane array comprises a plurality of wire grid polarizers.

6. The method of claim 4, wherein the focal plane array comprises a plurality of super pixels, each super pixel comprised of a 2×2 array that measures four (4) states of polarization, the states of polarization comprising 0°, 45°, 90°, and 135° states of linearly polarized light.

7. The method of claim 4, wherein the focal plane array comprises a plurality of super pixels, each super pixel comprised of a three-pixel array that measures three (3) states of polarization, the states of polarization comprising 0°, 60° and 120° states of linearly polarized light.

8. The method of claim 4, further comprising rotating the polarization filter and capturing images of the face with the filter at multiple orientations.

9. The method of claim 8, wherein the multiple orientations comprise 0°, 45°, 90°, and 135°.

10. The method of claim 9, wherein the images obtained at the multiple orientations are captured sequentially in time.

11. The method of claim 10, wherein the images obtained at the multiple orientations are captured before the subject's face moves more than ¼ pixel.

12. A system for enhancing images for facial recognition, comprising:
    a long wave infrared polarimeter configured to record polarized image data of a subject's face;
    the system configured to record, with the long wave infrared polarimeter, raw image data of a subject's face to obtain a number of polarized images, the system further configured to correct the polarized images for non-uniformity, to calculate Stokes parameters $S_0$, $S_1$, and $S_2$ from the polarized images to create Stokes images by weighted subtraction of the polarized images; and to compute polarization images derived from the Stokes images.

13. The system of claim 12, the system further configured to compute a Degree of Linear Polarization (DoLP) image from the Stokes parameters and apply facial recognition algorithms to the DoLP image.

14. The system of claim 12, the polarimeter comprising an objective lens, a polarization filter, and a focal plane array.

15. The system of claim 14, wherein the focal plane array comprises a plurality of wire grid polarizers.

16. The system of claim 14, wherein the focal plane array comprises a plurality of super pixels, each super pixel comprised of a 2×2 array that measures four (4) states of polarization, the states of polarization comprising 0°, 45°, 90°, and 135° states of linearly polarized light.

17. The system of claim 14, wherein the focal plane array comprises a plurality of super pixels, each super pixel comprised of a three-pixel array that measures three (3) states of polarization, the states of polarization comprising 0°, 60° and 120° states of linearly polarized light.

18. The system of claim 14, wherein the polarization filter is a rotating filter and the logic is further configured to capture images of the face at multiple orientations of the rotating filter.

19. The system of claim 17, wherein the multiple orientations comprise 0°, 45°, 90°, and 135°.

20. The system of claim 18, further configured to capture the images of the multiple orientations sequentially in time.

21. The system of claim 19, further configured to capture the images of the multiple orientations before the subject's face moves more than ¼ pixel.

* * * * *